(12) United States Patent
Houston

(10) Patent No.: US 8,049,139 B2
(45) Date of Patent: *Nov. 1, 2011

(54) SYSTEM AND METHOD FOR DETERMINING AND EMPLOYING CONSUMABLE USE BY ELECTRIC ARC WELDERS

(75) Inventor: William S. Houston, Avon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1535 days.

This patent is subject to a terminal disclaimer.

(21) Appl. No.: 11/455,586

(22) Filed: Jun. 19, 2006

(65) Prior Publication Data

US 2007/0289959 A1 Dec. 20, 2007

Related U.S. Application Data

(62) Division of application No. 10/229,479, filed on Aug. 28, 2002, now Pat. No. 7,072,774.

(51) Int. Cl.
*B23K 9/10* (2006.01)
*B23K 9/12* (2006.01)
*G06G 7/00* (2006.01)
*G07B 17/02* (2006.01)

(52) U.S. Cl. ............. 219/130.01; 219/130.1; 219/130.5; 219/137.7; 705/400; 705/404; 705/409

(58) Field of Classification Search .............. 219/130.1, 219/130.01, 130.5, 137.7; 705/400, 404, 705/409, 414

See application file for complete search history.

(56) References Cited

U.S. PATENT DOCUMENTS

| | | | | |
|---|---|---|---|---|
| 5,676,867 A | * | 10/1997 | Van Allen | 219/130.1 |
| 5,744,775 A | * | 4/1998 | Yasuda et al. | 219/69.12 |
| 6,809,292 B2 | * | 10/2004 | Spear et al. | 219/130.5 |
| 7,072,774 B1 | * | 7/2006 | Houston | 702/33 |
| 7,271,365 B2 | * | 9/2007 | Stava et al. | 219/130.51 |
| 2004/0256362 A1 | * | 12/2004 | Sato et al. | 219/69.12 |
| 2006/0273077 A1 | * | 12/2006 | Soltis et al. | 219/137 WM |

FOREIGN PATENT DOCUMENTS

| | | |
|---|---|---|
| EP | 0468953 | 1/1992 |
| JP | 60-99482 A | 6/1985 |
| JP | 07116842 | 5/1995 |
| JP | 2001-357123 A | 12/2001 |
| SE | 51542 | 6/2001 |
| WO | WO 02/058878 A1 | 8/2002 |

OTHER PUBLICATIONS

Funderburk, R. Scott, "A Look at heat input", Welding Innovation vol. XVI, No. 1, 1999, pp. 1-4.* EP 03 01 87782, European Search Report, Dec. 5, 2003, Munich.
Funderburk, R. Scott, "A Look at Heat Input", Welding Innovation vol. XVI, No. 1, 1999, pp. 1-2.
JP 2003-30903; JPO Search Report (attached to Official Action), dated May 31, 2005.

* cited by examiner

*Primary Examiner* — Henry Yuen
*Assistant Examiner* — Ayub Maye
(74) *Attorney, Agent, or Firm* — Kevin M. Dunn; Lou F. Wagner; Hahn Loeser & Parks

(57) ABSTRACT

A system and method for determining the approximate weight of metal consumables used by an electric arc welder over a period of welding time, the system comprises a program to calculate the total energy exerted by the welder over a period of welding, a divider to divide the total energy by a number including a power of a selected non-unity factor to obtain said weight. When the energy is in mega joules the factor is in the range of 3.2-4.2 and preferably approximately 4.0.

12 Claims, 3 Drawing Sheets

SYSTEM AND METHOD FOR DETERMINING AND EMPLOYING CONSUMABLE USE BY ELECTRIC ARC WELDERS

INCORPORATION BY REFERENCE

This application is a divisional application of U.S. application Ser. No. 10/229,479, filed Aug. 28, 2002 now U.S. Pat. No. 7,072,774, the entire disclosure of which is incorporated herein by reference.

FIELD OF THE INVENTION

The present invention relates to the field of electric arc welding and more particularly to a system and method for determining the amount of consumables used by an electric arc welder and use of this consumable use information.

BACKGROUND OF INVENTION

Electric arc welding involves the melting and deposition of metal in the form of an electrode onto adjacent metal structures known in combination as the workpiece. Metal welding wire, or the electrode, is referred to as a "consumable" or "consumables" and the amount of metal consumables deposited during a welding operation is one cost element of the welding process. As a welder is operated over a period of time, it must be provided with appropriate metal consumables to replenish the supply allowing continuation of the welding operation. Over time, the cost of the consumables is a primary factor in the welding operation, far exceeding the cost of the electric arc welder using the consumable. Consequently, it is desirable for a manufacturer of electric arc welders to also be the source of consumables used by the welder so that the welder and consumables may be coordinated or otherwise matched to optimize the total welding procedure. In implementation of a program for selling consumables for use with an electric arc welder it is advantageous to know the amount of consumables being used by the electric arc welder over a period of time, such as a week, month, quarter, half year, or year. In the past, the only procedure for determining the use of consumables for a particular arc welder was to rely upon the purchase history of the welding facility. Thus, if a welder was used for a period of welding and a certain volume of consumables was purchased for that welder during the same period, it was concluded that the ordered amount was the actual amount used. However, if the welding facility purchased consumables from another source, the amount of consumables consumed could not be determined by the known consumables purchased. In some instances, a fee is used for the operation of an electric arc welder. It is desirable to discount the fee for the use of the welder based upon the purchase of consumables from the originator of the welder. To accomplish this business technique, it is necessary to determine the relationship between the known amount of purchased consumable and the actual amount of consumables used during a fee period. This type of business plan, and others, are predicated on the historical feedback use information from the welding facility to determine the proportion of consumables purchased from the manufacturer of the equipment. This feedback information is then used as a basis for determining the machine operating fee. This same concept is employed when a welder is subject to a royalty discounted by use of consumables from a certified, approved source. All of these business procedures are predicated upon historical information regarding the use of consumables during a preset period of welding. Such historical data based upon feedback information from the welding facility is not consistent and can not be employed with a high degree of certainty. There has been no system or method for determining the consumables used by an electric arc welder except by purchase records for such consumables during a period of time or actual weight recording at the welder. This information has no relationship to the actual time that the welder is operated but is available for only an absolute time span known as the "period of welding", i.e. a week to a year.

THE PRESENT INVENTION

The present invention recognizes the difficulty in determining the use of consumables merely by the amount of consumables purchased over a preselected time period or "period of welding". Consequently, the invention relates to a system and method for determining the consumables used by an electric arc welder based upon the amount of energy exerted by the welder over the period of welding. This is distinct from the prior art that employed feedback historical data on consumables purchased as an indication of consumables used by the electric arc welder. If the welder were used twenty-four hours a day or only during one shift the same procedure for evaluating consumables use was available in the prior art. At best, prior art systems and methods recorded only purchased consumables or measured weight of consumables for a set time period. Such information does not indicate the actual amount of consumables employed by the arc welder during welding, but gives only the recorded amounts over a fixed time.

In accordance with the present invention, there is provided a system for determining the approximately weight of metal consumed by an electric arc welder over a period of welding time without relying upon purchase data or recorded data based upon the consumable delivered to the welder. This system includes a sensor that reads arc current, a sensor that reads arc voltage, a multiplier to obtain weld power, a weld time multiplier of the weld power to obtain a representation of the total joules over said period of welding time. The "weld time" is the time the welder is actually in operation. The period of welding time would be the calendar designation or time period of operation. Consequently, any twenty-four hour period, the welding time would be twenty-four hours; however, the weld time would be the time during which the welder is actually operating. The divider circuit divides the exerted joules by one million to obtain a representation of mega joules and then a second divider circuit divides the mega joules by a selected factor in the range of 3.2-4.2 to obtain a value indicative of the approximate weight of consumables used during the welding time. To divide the mega joules by the selected factor, it is possible to perform the division process at the arc current sensor, the arc voltage sensor, the multiplied value resulting in weld power, the weld time, or the joules. Thus, the selected factor can be a division operation at any of the parameter constituting the mega joules calculation. As a basic concept, it has been found that there is a direct, fixed numerical relationship between energy exerted by an arc welder and electrode consumption. This numerical relationship is approximately 4.0 mega joules to each one pound of metal consumables. Consequently, if the welding is at low heat, thus low energy, a lesser amount of consumables is used. At higher heat, more consumables are used. Consequently, by employing this novel concept of a selected numerical factor for the relationship between the mega joules consumed by the welder during a period of time and the consumables actually used, the weight of consumables used by the welder can be determined. The only variable required is the amount of energy exerted by that welder. This numerical relationship has been found to be a factor of approximately 4.0; however, in practice it has been adjusted between about 3.2 and 4.2 with consistent results. The true value of the factor is approximately 4.0. The number is only one aspect of the invention. The broad inventive concept is applying such a factor in determining the amount of consumables employed by a welder during a welding time. The novelty is predicated upon the realization that there is a fixed numerical relationship. As an example, a welder that expends or exerts four mega joules during an eight hour shift will consume about one pound of welding wire. This fixed relationship has been proved to be consistent. Even if the fixed number was 3.5, 3.8, or 4.2, the novel concept of a fixed numerical relationship is invaluable for monitoring a welder based upon use of metal consumables. By merely measuring the available information regarding the energy exerted by an electric arc welder, the amount of consumables used during the welding operation is known. This information is invaluable in monitoring and controlling the consumable use by an electric arc welder.

By being able to determine the amount of consumables used by a particular arc welder through calculation of the energy developed by the welder, many business plans can be implemented. In accordance with an aspect of the invention, a system is provided for determining the percentage discount in the set royalty or use fee due for an electric arc welder where the discount is based upon the percentage of used consumables purchased from a single source. In this type of business arrangement, an electric arc welder is commissioned to perform a proprietary welding operation and an agreed upon amount of royalty or fee is to be paid for the use of the welder. Such an arrangement involves the discount of the royalty rate or fee according to the amount of consumables purchased from a single known source. In other words, if a 100% of consumable is purchased from a known source, the royalty or fee for a welding time is discounted. In the past there has been no procedure or technique to compare the consumable purchases to the time of welding. The invention using this system knows the amount of consumables by calculating the exerted energy. In accordance with this system, there is a software circuit or routine for calculating the total joules exerted by the welder over a period of welding. This period could be a week, month, quarter or a year to name a few. A software circuit then records the amount of consumables purchased from the known single source for use during the period of welding. An additional software circuit then divides by one million to provide the mega joules exerted by the welder over the period of welding. This circuit converts the total joules into mega joules; however, the system will operate by using the total joules alone, without conversion to mega joules. A software divider then divides the mega joules by a selected non-unity factor in the range of 3.2-4.2 to provide a representation of the actual consumable used during the period of welding. The multiplication of the mega joules by the selected non-unity factor produces a number representing the weight or amount of consumables that the welder should consume. Consequently, by including in the system a divider circuit for dividing the purchased consumables by the number representation of the known weight of consumables used by the welder, a percentage discount is obtained. The system is performed by software and the term "circuit" means a subroutine in the software for accomplishing the function of the particular "circuit". All multipliers, dividers and other processing circuits or functions of the invention are accomplished by software implementation.

In accordance with an aspect of the invention, the mega joules exerted by the welder over the period of welding is transmitted to the supplier of the consumables over the internet or otherwise. This system is further employed to include a software circuit to multiply the set royalty or fee by the percentage discount to obtain the amount of royalty or fee due for the period of welding. This system employs the novel concept of a fixed numerical factor that is multiplied by the mega joules to provide the weight of consumables. This fixed numerical factor is approximately 4 mega joules to one pound of consumables. The conceptual aspect of this fixed numerical relationship may be adjusted between about 3.2-4.2 mega joules for each one pound of consumables used by an electric arc welder.

In practicing the preferred embodiment of the invention, the mega joules exerted by the welder over a period of welding is obtained by a sensor reading the arc current, a sensor reading the arc voltage, a multiplier to obtain the weld power and a weld time multiplier of the weld power to obtain the numerical representation of the total expended joules. To calculate mega joules, this numerical representation is divided by one million. The "weld time" is the time during which a welding process is being performed. The "period of welding" is the expiration period of time over which a process is evaluated.

In accordance with another aspect of the present invention there is provided a system for ordering consumables for an electric arc welder. This system comprises a circuit or software routine to calculate the total energy exerted by the welder over a period of welding, a divided to divide the total energy by a fixed number that is a power of a selected non-unity factor to obtain the amount of consumables used by the welder. Then an order is placed for a percentage of the amount. This percentage may be 100%. The term "a power of a selected non-unity factor" is used to indicate when the total energy is not converted to mega joules. The factor 4.0 is $4.0 \times 10^6$. The term "non-unity factor" is used to mean a factor that is not 1.0. The basic concept of the invention is the discovery that there is such a non-unity factor which gives the numerical relationship between joules and amount of consumables used during actual welding. It has been discovered that the factor is approximately 4.0 for all welding processes using advancing welding wire. Consequently, if 4.0 mega joules are expended by the electric arc welder, one pound of consumables is used. This discovery is used in welding applications for a variety of purposes.

In accordance with yet a further aspect of the present invention, there is provided a system for determining approximate weight of metal consumable used by an electric arc welder over a period of welding time. This system comprises a circuit or software subroutine to calculate the total energy exerted by the welder over a period of welding, a divider to divide the total energy by a number including the power of a selected non-unity factor to obtain the weight. This is the basic implementation of the present invention. When the energy is mega joules the non-unity factor is in the range of 3.2-4.2. In practice over the range of electric arc welding processes using advancing metal wire, the selected factor is approximately 4.00.

The present invention is also implemented as a part of a system for determining the efficiency of an electric arc welder. This system comprises a circuit or software subroutine to calculate the total energy exerted by the welder over a period of welding, determining the actual amount of consumable deposited by the welder during said period, a divider or subroutine to divide the total energy by a selected non-unity factor to obtain an energy component or numerical representation and then a dividing circuit or divider to divide the amount of consumables used by the energy component or numerical representation to obtain the efficiency of the welder.

In accordance with another aspect of the present invention, there is provided a method for determining the approximate weight of a metal consumable used by an electric arc welder over a period of welding time. The method involves reading the arc current, reading the arc voltage, multiplying the arc current with the arc voltage to obtain weld power, multiplying the weld power by the weld time to obtain a numerical representation of the total expended joules over the period of weld time, dividing the joules by one million to obtain a numerical representation of mega joules, dividing the arc current, arc voltage, weld power, weld time, joules or the mega joules numerical representation by a selected number in the range of 3.2-4.2 to obtain the total weight of the consumables used. The selected value is approximately 4.0 for a welding process of the type using an advancing welding wire as the metal consumables. The "weld time" is the time the welder is actually welding and the "period of welding" time is the time over which the process is being evaluated. In practice, the arc current and arc voltage is measured by sensors and the remainder of the acts are performed by software implementation.

In accordance with another aspect of the present invention, there is provided a method for determining the percentage of discount in the set royalty or fee due to consumables used by an electric arc welder where the royalty or fee discount is based upon the percentage of consumables purchased from a single source. This method comprises calculating the total joules exerted by the welder over a period of welding, recording the amount of consumables purchased from the single source for use during the period of welding, providing the mega joules exerted by the welder over the period of welding, dividing the mega joules by a selected numerical factor in the range of 3.2-4.2 to provide a numerical representation of the actual consumables used during the period of welding, dividing the recorded purchased consumables by the representation of the actual used consumables to obtain the percentage discount for the royalty rate or fee.

As a basic aspect of the present invention there is provided a method for determining the approximate weight of metal consumables used by an electric arc welder over a period of welding. This method comprises calculating the total energy exerted by the welder over the period of welding, dividing the total energy by a number including a power of a selected non-unity factor to obtain the weight. When the energy is measured in joules, the factor is in the range of 3.2-4.2 and preferably approximately 4.0. This basic concept of equating the energy exerted by the welder as indicative of the consumables used is an underlying novel aspect of the invention.

The primary object of the present invention is the provision of a system and method for determining the metal consumables used by an electric arc welder employing the concept of a fixed numerical relationship between the expended energy and the weight of metal consumables. This fixed numerical relationship is approximately 4.0 mega joules for each one pound of metal consumables used in the welding process.

In accordance with another aspect of the invention there is a provision of a system and method, as defined above, which system and method determines the metal consumables used based upon the energy exerted, irrespective of the actual welding process time.

Yet another object of the present invention is the provision of a system and method, as defined above, which system and method can be used to calculate royalty or fee discounts, efficiency, maintenance scheduling, and/or leasing of an electric arc welder.

These and other objects and advantages will become apparent from the following description taken together with the accompanying drawings.

PREFERRED EMBODIMENTS

Figure 1:
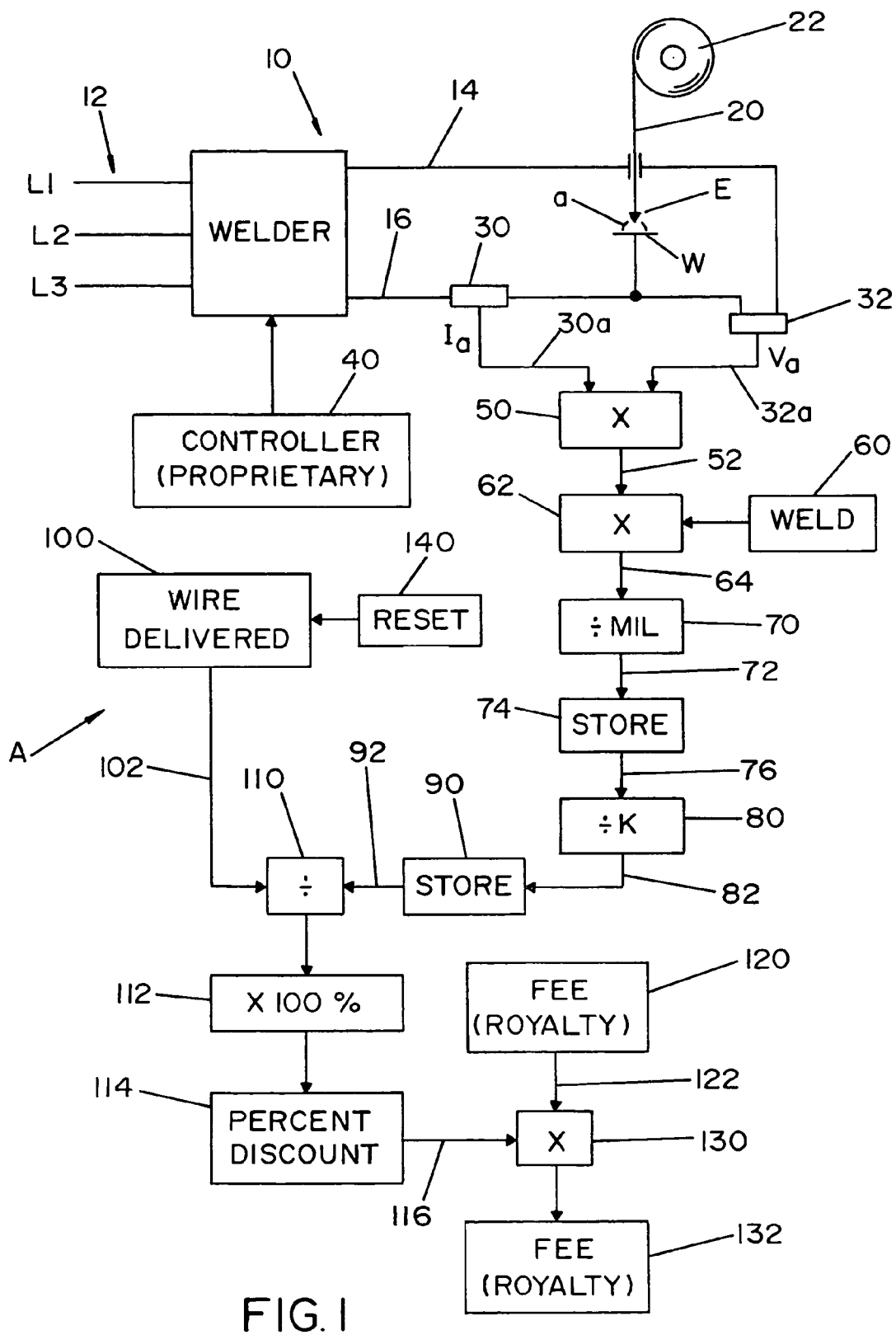
FIG. 1 is a flow chart and block diagram of the system and method employed for use in calculating the first percent discount of a fee and for calculating the fee due when operating an electric arc welder in accordance with an agreement regarding payment of fee based upon wire used in a welding process.

Referring now to the drawings, wherein the showings are for the purpose of illustrating a preferred embodiment of the present invention and not for the purpose of limiting same, FIG. 1 discloses a system A to perform a method that is used to determine the consumables used during a welding time by electric arc welder 10 driven from a three phase power supply 12 to create a current wave form at leads 14, 16. The waveform causes an arc a across electrode E and workpiece W. Electrode E is a metal consumable in the form of welding wire 20 advancing from reel 22 to be melted by arc a and deposited onto workpiece W. In practice, workpiece W comprises two metal elements to be joined. During the welding process, arc current Ia is read by sensor 30, illustrated as a shunt. A voltage in lead 16 represents the arc current. In a like manner, arc voltage Va is read by sensor 32 across the arc. Consequently, the arc current is an analog signal appearing in lead 30a and the arc voltage is an analog signal appearing in lead 32a. In the illustrated embodiment, welder 10 performs an arc welding process in accordance with a patented or trade secret proprietary technology involving a unique wave form from the waveform generator section of a standard controller 40. During the weld time, welder 10 operates to perform the proprietary welding process. During this time, welding wire 20 is advanced toward workpiece W from reel 22. The amount of welding wire employed during welding is the consumption of the consumable in the welding process. The period of welding time is the total time during which system A monitors the operation of welder 10. The "weld time" is the time that the welder is actually performing a welding operation. The amount of metal consumable employed in the welding process is the metal consumable used during the weld time as a welding process is being performed. The period of welding time is the shift or expired time during which system A performs the inventive aspects of the present invention. The period of welding time is continuous and is not related to the actual weld time of the welder.

One implementation of the invention is its use in system A wherein the functions or operations are illustrated in block diagram form or as a flow chart. In practice the functions are performed by a software program. Multiplier or multiplier stage 50 receives analog voltages in lines 30a, 32a. These voltages are converted by an A/D converter and multiplied together to give the weld power as represented by the number at line 52. In practice, the analog signals in lines 30a, 32a are sometimes multiplied and then digitized for the digital or numerical representation of power in line 52. Preferably, the current and voltage signals are first converted to digital information and then multiplied by stage 50. Whenever welder 10 is operated to perform a weld process, block diagram 60 is energized to enable block 62 to multiply With the weld power value in line 52 by weld time. Block or stage 62 accumulates power for the weld time. This provides the accumulated energy exerted by welder 10 as a signal in line 64. This numerical representation of energy is divided by divider stage 70 with a value of one million. This merely changes the decimal point for the accumulated energy as represented by line 64. Consequently, the consumed, or exerted, energy of welder 10 in mega joules is numerically represented by line 72. This consumed or exerted energy in mega joules is stored in memory 74 having a readable output 76. Divider stage 80 is set to a selected non-unity factor. This factor is generally approximately 4.0; however, it may be adjusted between about 3.2-4.2. The inventive concept is the use of a fixed numerical factor at this stage in the analysis of the exerted energy. Through the inventive concept of dividing by a non-unity factor, the weight of consumables used by welder 10 is determined. This data or value is the essence of the present invention and is used in system A to automatically compute percentage discount for a business plan which licenses welder 10 at a fee discounted by the percentage of consumables purchased for use at welder A. The mega joules representation stored in memory 74 and divided by factor K as indicated by divider stage 80 is outputted or read by line 82. The number or representation is stored in memory 90 for use in system A. In practicing the invention, the non-unity power factor K is introduced in various constituents of the mega joule calculation. The digitized arc current or arc voltage is sometimes divided by the factor K. Weld power in line 52 or the weld time 60 is sometimes divided by the factor K. Further, the energy and joules as indicated by line 64 is divided by factor K. In summary, the factor K can be introduced into the calculation at any stage without being considered anything except the division of the mega joule energy consumed during the period of welding. The novel concept is that a fixed factor K times energy equals the weight of metal consumable used by welder 10. The amount of consumables supplied to welder 10 is recorded and stored as indicated by memory or accumulator 100. This data is obtained by a computer reading shipping records, receiving records or invoicing information. The weight of metal consumables used during the period of welding is represented by line 102 directed to divider stage 110 where the number is divided by the factored energy representation or numerical value at line 92. The number obtained by stage 110 is multiplied by 100% at stage 112 to provide a percentage of discount as indicated by block 114 and outputted or read at line 116.

Turning now to the use of system A for the purpose of calculating fees due when the fees are discounted by the volume of consumables used during the welding process. A royalty or fee is recorded in block 120 and outputted or read at line 122 to be multiplied by stage 130 with the discount number in line 116. Thus, the royalty or fee due per unit time is outputted to register 132. This same concept could be used for changing the royalty due per volume of wire delivered. In that instance, the amount of wire delivered as indicated by the value on line 102 would be multiplied by a royalty rate in addition to the basic cost of the consumable. This royalty rate is discounted according to the number at line 116. No royalty for the consumable is charged if 100% of the consumables are purchased from a known single source. A lesser percentage of the metal consumable used, as determined by the value of the factor energy on line 92, causes a higher royalty rate for the metal consumable. This is another system for using the novel concept to obtain a royalty rate for the metal consumable used by welder 10. System A is reset as indicated by block 140 during each period of welding for which the fee or royalty discount is calculated. System A utilizes a system for determining the approximate weight of the metal consumable used by electric arc welder 10 over a period of welding time. The system comprises a program to calculate the total energy exerted by welder 10 over a period of welding, a dividing stage, shown as dividers 70 and 80, to divide the total energy by a number including a power of a selected non-entity factor to obtain the weight of consumable used. When using divider stage 70 the factor is in the range of 3.2-4.2 and is preferably about 4.0. The function of divider 70 and divider 80 is sometimes combined as a single dividing stage.

Figure 2:
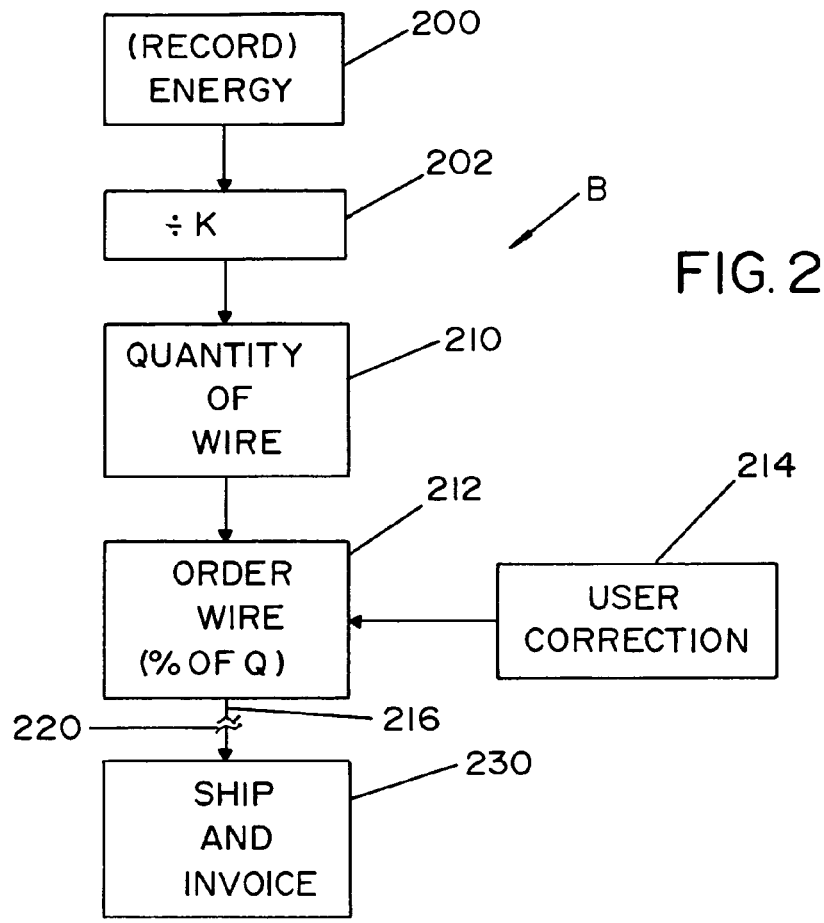
FIG. 2 is a flow chart and block diagram of the use of the present invention in inventory control.

The inventive concept explained with respect to system A is also used in system B of FIG. 2. This system performs a method for using the basic novel fixed numerical relationship between exerted energy and weight of consumables for inventory control. The total energy in mega joules as stored in memory 74 is recorded or stored in block 200. The mega joules used by welder 10 are then divided by factor K at divider stage 202 to provide the quantity of metal consumables used in operation of welder 10 over a period of welding time. This quantity Q represented by block 210 is directed to block 212 for replenishing the wire that has been consumed. The wire is ordered automatically for the purposes of maintaining an inventory. In practice, the user increases or decreases the percentage of the quantity Q being ordered as indicated by block 214. The total metal consumables to be ordered are outputted or read and appear on line 216 for transmission by telephone or other network. In practice, this network is internet 220 communicated with the supplier of the metal consumable or wire. When the information is received an automatic instruction is processed at the supplier to ship and invoice from the remotely located supplier as indicated by block 230. Consequently, the inventory of consumables at welder A is maintained. Other inventory systems are implemented using the basic concept of the present invention relating to the fixed numerical relationship between exerted energy by welder 10 and the weight of metal consumables used.

Figure 3:
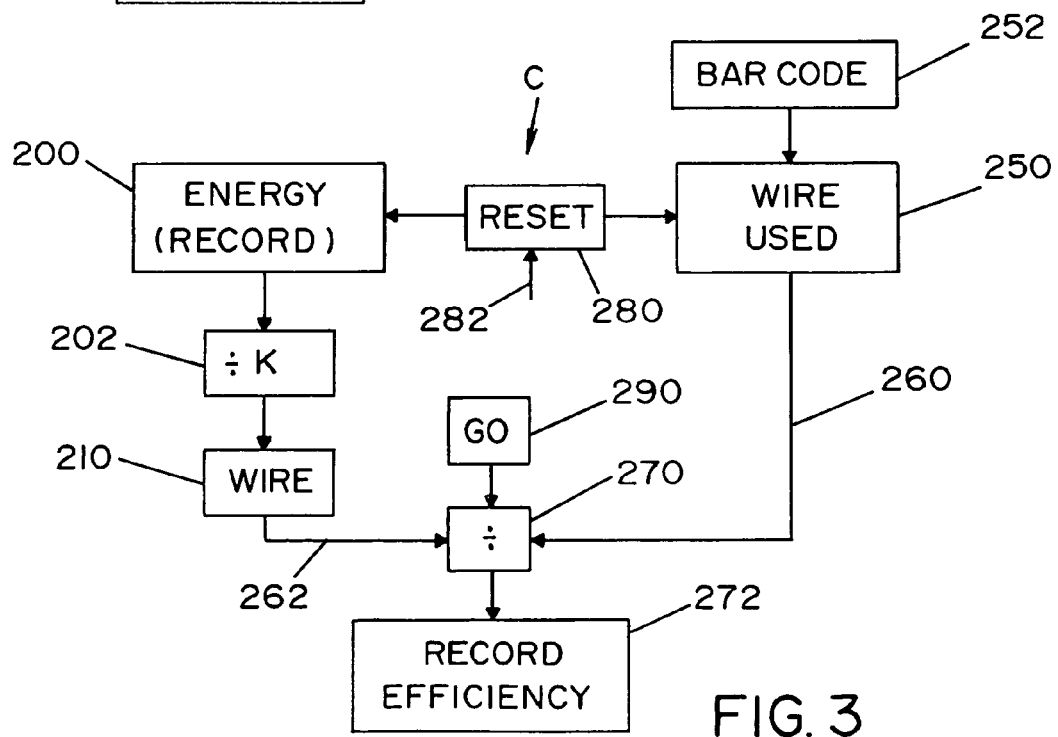
FIG. 3 is a flow chart and block diagram of the use of the present invention for determining the efficiency of the welding operation; and, FIG. 4 is a flow chart and block diagram showing the aspect of the invention where the accumulated energy is used for the purposes of maintenance scheduling and leasing.

The basic concept of the present invention is also used to determine the efficiency of the welding operation performed by welder A. A representative system C for this purpose is disclosed in FIG. 3, wherein the wire used by welder A is recorded or accumulated in block 250. To obtain the total weight of wire used, bar code information on the reel and drums used during the welding time under consideration is read by bar code reader 252. Each addition of wire increases the recorded quantity of wire stored in block 250. Output 260 of block 250 is a numerical number representing the total amount of wire used by welder A during the weld time of welder A. Output of the quantity calculation from block 210 shown in FIG. 2 produces a theoretical known wire quantity, represented by the number in line 262. The actual wire used represented by the number in line 260 is divided by the theoretical wire quantity as the number in line 262. This operation is performed at divider or divider stage 270. The result of this operation is the efficiency of welder A and is recorded at block 272. This recording is made periodically and is reset to be reprocessed by reset block 280 upon receipt of a reset signal in line 282. Divider stage 270 is operated periodically from a signal from the GO block 290. Other architectures could be used in a software program to accomplish the objective of measuring the efficiency based on the theoretical quantity of wire used by welder A using the concept of the present invention and the actual amount of welding wire or consumables used in the welding process.

Figure 4:
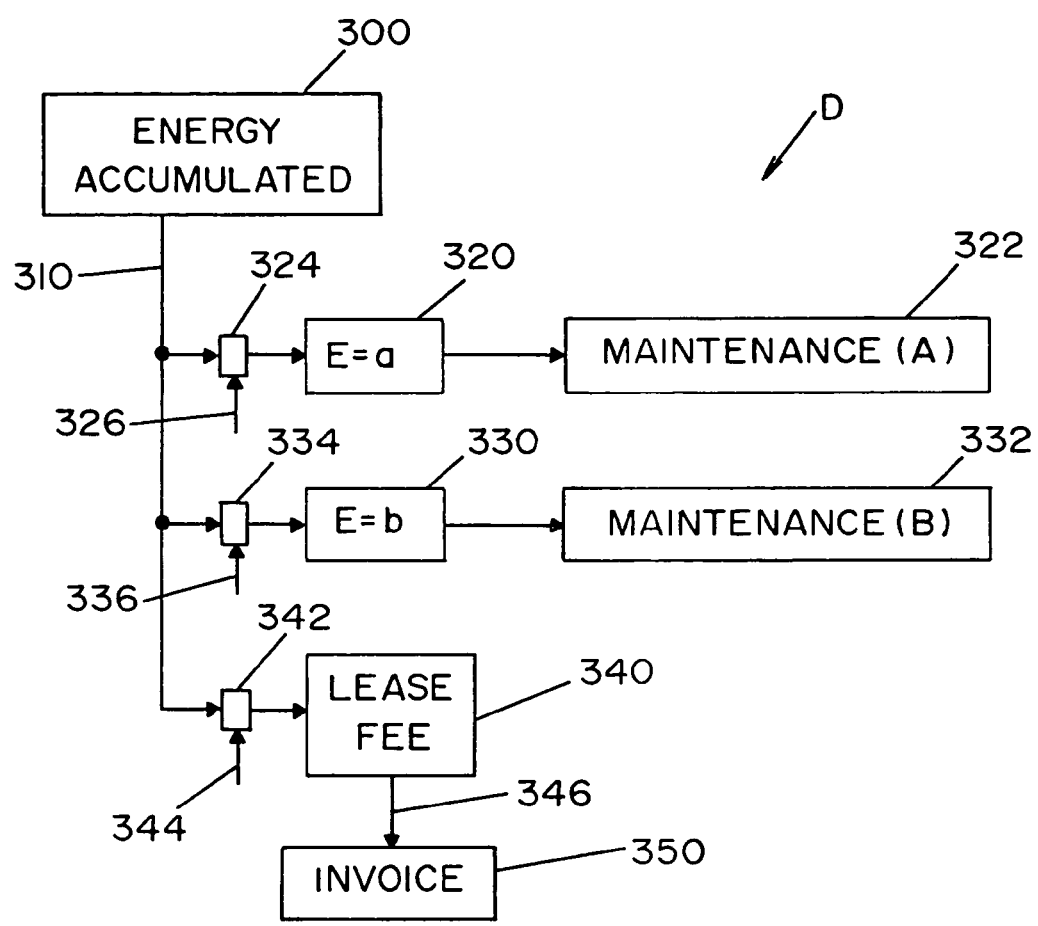

When practicing the present invention, the energy exerted by welder A during a welding period is accumulated at line 64, at storage or memory device 74, and at storage or memory device 90. In an aspect of the invention, the total consumed energy is accumulated irrespective of the period of welding. This concept is indicated by energy accumulator 300 in FIG. 4 where system D uses the total energy to schedule or calculate a lease fee. Stored energy in accumulator 300 is read and outputted to network 310. This network can be Ethernet, internet or combinations thereof. The network is communicated with comparator 320 that activates maintenance procedure 322 when the accumulated energy exceeds a preselected amount a. Maintenance procedure 322 is preferably replacing a torch component experiencing wear depending upon amounts of energy exerted. After the maintenance procedure has been implemented, input accumulator 324 is reset by signal 326. The maintenance scheduling time is then reset for subsequent comparison through comparator 320. In a like manner, comparator 330 determines when the accumulate energy reaches a preset value b. This event then activates maintenance procedure 332 which indicates time for revamping the wire feeder or periodic maintenance of the welder itself. After the maintenance protocol has been performed, accumulator 334 is reset by a signal on line 336. Thus, maintenance procedures 322 and 332 are periodically implemented.

The energy on network 310 is also used for the purpose of determining the lease fee based upon use of the welder. In accordance with the invention, the use of the welder is determined by the accumulated energy that is directed to block 340 through accumulator 342 having a reset line 344. The reset line starts the lease fee calculation. The amount of energy is accumulated in block 340 by way of accumulator 342. The lease fee is the product of lease amount multiplied by energy. This product is outputted by line 346 to an invoicing program indicated as block 350. The lease fee system utilizing block 340 and invoicing program 350 can be at a remote location serviced by the internet.

The basic concept of the invention, which is the relationship of exerted energy to weight of metal consumables employing a fixed numerical factor can be used in various other systems besides systems A, B, C and D disclosed in this application.

Having thus defined the invention, the following is claimed:

1. A system for determining characteristics of an electric arc welder or a metal consumable used by the electric arc welder, said system comprising:
    a circuit to calculate a total energy exerted by an electric arc welder over a period of welding the circuit includes,
        a current sensor that measures a current delivered by an electric arc welder during each weld time within said period of welding;
        a voltage sensor that measures a voltage delivered by an electric arc welder during each weld time within said period of welding;
        a first multiplier that multiplies the current and the voltage to obtain a weld power for each weld time;
        a second multiplier that multiplies the weld power and the weld time to obtain the total energy exerted over said period of welding;
    a divider to divide said total energy by a factor in the range of 3.2-4.2 to provide a representation of the weight of actual metal consumable used during said period of welding.

2. A system as defined in claim 1, wherein the non-unity factor is 3.2-4.2 mega-joules to each pound of metal consumables.

3. A system for determining a percentage discount in a set fee due to metal consumable used by an electric arc welder, where a royalty discount is based upon a percentage of used metal consumable purchased from a single known source, said system comprising:
    a circuit for calculating total mega joules exerted by an electric arc welder over a period of welding, the circuit includes,
        a current sensor that measures a current delivered by an electric arc welder during each weld time within said period of welding;
        a voltage sensor that measures a voltage delivered by an electric arc welder during each weld time within said period of welding;
        a first multiplier that multiplies the current and the voltage to obtain a weld power for each weld time;
        a second multiplier that multiplies the weld power and the weld time to obtain the total energy exerted over said period of welding;
    a circuit to record the amount of metal consumable purchased from said single source for use during said period of welding,
    a circuit to divide said mega joules by a selected factor in the range of 3.2 to 4.2 to provide a representation of the weight of actual metal consumable used during said period of welding, and
    a circuit to divide said recorded purchased metal consumable by said representation of the actual used metal consumable to obtain said percentage discount.

4. A system as defined in claim 3, including
    a circuit to multiply said set fee by said percentage discount to obtain an amount of fee due to said period of welding.

5. A system as defined in claim 4 wherein said set fee is a royalty based upon metal consumable used.

6. A system as defined in claim 4 wherein said circuit for calculating the total mega joules exerted by said welder over a period of welding comprises
    a sensor reading arc current,
    a sensor reading arc voltage;
    a multiplier to obtain weld power and
    a weld time multiplier of said weld power to obtain a representation of total expended joules.

7. A system for ordering a metal consumable for an electric arc welder, said system comprising:
    a circuit to calculate the total energy exerted by an electric arc welder over a period of welding, the circuit includes,
        a current sensor that measures a current delivered by an electric arc welder during each weld time within said period of welding;
        a voltage sensor that measures a voltage delivered by an electric arc welder during each weld time within said period of welding;
        a first multiplier that multiplies the current and the voltage to obtain a weld power for each weld time;
        a second multiplier that multiplies the weld power and the weld time to obtain a total energy exerted over said period of welding; and
    a divider to divide said total energy by a number including a power of a factor in the range of 3.2-4.2 to obtain the weight amount of metal consumable used by said welder, and ordering a percentage of said amount.

8. A system as defined in claim 7 wherein said percentage is adjustable.

9. A method for determining a percentage discount in a set royalty due for metal consumable used by an electric arc welder, where the royalty discount is based upon a percentage of used metal consumable purchased from a single known source, said method comprising:
- (a) calculating total mega joules exerted by an electric arc welder over a period of welding via a circuit device, said circuit device performing:
  - measuring a current delivered by an electric arc welder during each weld time within said period of welding;
  - measuring a voltage delivered by an electric arc welder during each weld time within said period of welding;
  - multiplying the current and the voltage to obtain a weld power for each weld time;
  - measuring a total amount of weld time that is a sum of each of the said weld times;
  - multiplying the weld power and the total weld time to obtain the total energy exerted over said period of welding;
- (b) recording an amount of metal consumable purchased from said single source for use during said period of welding;
- (c) dividing said mega joules by a selected factor in the range of 3.2 to 4.2 to provide a representation of the actual metal consumable used during said period of welding; and,
- (d) dividing said recorded purchased metal consumable by said representation of actual used metal consumable to obtain said percentage discount; and
- (e) ordering a quantity of metal consumable based on said percentage discount.

10. A method as defined in claim 9 including a circuit to multiply purchased metal consumable by said set royalty and then by said percentage discount to obtain the amount of royalty due for said period of welding.

11. A method for ordering a metal consumable for an electric arc welder, said method comprising:
- (a) calculating a total energy exerted by an electric arc welder over a period of welding via a circuit device, said circuit device performing:
  - measuring a current delivered by an electric arc welder during each weld time within said period of welding;
  - measuring a voltage delivered by an electric arc welder during each weld time within said period of welding;
  - multiplying the current and the voltage to obtain a weld power for each weld time;
  - measuring a total amount of weld time that is a sum of each of the said weld times;
  - multiplying the weld power and the weld time to obtain the total energy exerted over said period of welding;
- (b) dividing said total energy by a factor of 3.2-4.2 to obtain an amount of metal consumable used by said welder; and,
- (c) ordering a percentage of said amount.

12. A method as defined in claim 11 wherein said percentage is adjustable.

* * * * *